United States Patent [19]
Gordon, III et al.

[11] Patent Number: 5,594,076
[45] Date of Patent: Jan. 14, 1997

[54] HYDRODEGRADABLE POLYESTERS

[75] Inventors: Bernard Gordon, III, State College, Pa.; Prabodh P. Sharma, Bombay, India

[73] Assignee: The Pennsylvania Research Foundation, University Park, Pa.

[21] Appl. No.: 485,162

[22] Filed: Jun. 7, 1995

Related U.S. Application Data

[63] Continuation of Ser. No. 135,035, Oct. 12, 1993, abandoned, which is a continuation-in-part of Ser. No. 60,763, May 11, 1993, abandoned, and a continuation-in-part of Ser. No. 764,652, Sep. 24, 1991, abandoned, said Ser. No. 60,763, is a continuation of Ser. No. 764,652, which is a continuation of Ser. No. 391,894, Aug. 10, 1989, abandoned.

[51] Int. Cl.$^6$ ............................................. C08G 63/183
[52] U.S. Cl. ........................ 525/444; 525/411; 525/938; 528/194; 528/302; 43/44.98
[58] Field of Search ................................. 525/444, 411, 525/938; 528/194, 302; 43/44.98

[56] References Cited

U.S. PATENT DOCUMENTS

| | | | |
|---|---|---|---|
| 3,413,379 | 11/1968 | Schade. | |
| 4,032,993 | 7/1977 | Coquard | 528/302 |
| 4,139,525 | 2/1979 | Bacskai | 528/302 |
| 4,311,824 | 1/1982 | Fayolle | 528/190 |
| 4,419,507 | 12/1983 | Sublett | 528/302 |
| 4,532,928 | 8/1985 | Bezwada | 528/173 |

*Primary Examiner*—Patricia A. Short
*Attorney, Agent, or Firm*—Dann, Dorfman, Herrell and Skillman

[57] ABSTRACT

Hydrodegradable polyesters based upon the random copolymerization of aromatic and absorbable aliphatic polyesters are disclosed. The hydrodegradable polyesters are useful in preparing a variety of products including disposable containers, disposable diapers, fishing lines and nets, and the like.

2 Claims, No Drawings

HYDRODEGRADABLE POLYESTERS

This is a continuation of U.S. application No. 08/135,035, filed Oct. 12, 1993, abandoned, which is a continuation-in-part of U.S. application No. 08/060,763, filed May 11, 1993, abandoned, and a continuation-in-part of U.S. application No. 07/764,652, filed Sep. 24, 1991, abandoned, U.S. application No. 08/060,763 being a continuation of U.S. application No. 07/764,652, which latter application is a continuation of U.S. application No. 07/391,894, filed Aug. 10, 1989, abandoned.

FIELD OF THE INVENTION

The present invention is concerned with providing hydrodegradable polyesters and products made therewith.

BACKGROUND OF THE INVENTION

Products made from polymeric materials have become a major environmental concern due to the difficulty in disposing of the spent products. The advantage of utilizing polymeric materials having infinite lifetimes to manufacture such items as disposable containers, fishing lines and nets, and disposable diapers has become an increasing environmental concern when these items are indiscriminately discarded into the environment. One solution proposed for reducing plastic wastes from these spent items is to design new polymers, or modify existing polymers, such that these newly developed plastics undergo degradation once the useful lifetime of the product is over and they are discarded.

Polymers may be made to degrade as they are continually used or after they are disposed by several different mechanisms. However, while each mechanism has its own advantages, each also has its faults.

Polymers may be made to degrade by photochemical means, for example. Thus, when the polymer is exposed to sunlight over protracted periods, it undergoes certain chemical changes resulting in its degradation. These polymers have a serious fault, however, in that the polymer will not degrade if the item is not exposed to the correct wavelength of sunlight. Thus, if the items made from a photodegradable polymer are discarded in a land fill, they will be buried, sunlight will not be able to reach the polymer, and degradation will not take place. Recycling of these materials is also difficult; there is no way of knowing how much degradation has occurred and the resulting new end groups on the polymer are ill defined.

Polymers may also be made to degrade by microbial means as well. Two such polymers are polycaprolactone (which is not a polymer of choice for many applications because of its poor overall physical characteristics) and blended polymers containing a enzymatic digestible component. One example of such a blended material is polyethylene which has mixed therewith an enzymatically degradable starch. When this polymer is discarded, enzymes produced by various bacterial and fungal species will attack the starch portions of the blended material, digesting it and leaving a very porous polyethylene residue which, unfortunately, stays in the environment.

Although aliphatic polyesters are well known to degrade by hydrolysis, aromatic polyesters that are commonly used for fibers and molded articles have been shown to undergo little, if any, degradation. A number of degradable polymers have received patents in the United States. For example, Stager and Minor have obtained U.S. Pat. No. 3,647,111 for a biodegradable soft drink can; Henry has obtained U.S. Pat. No. 3,676,401 for a photodegradable polyethylene film; Schmitt et al., have obtained U.S. Pat. No. 3,784,585 for water degradable resins containing blocks of polyglycolic acid units; Brackman has obtained U.S. Pat. No. 3,840,512 for degradable polyethylene; Guillet and Dan have obtained U.S. Pat. No. 3,878,169 for a photodegradable polyester; Coquard et al., have obtained U.S. Pat. No. 4,032,993 for implantable surgical articles which are bioresorbable and contain a copolyester of succinic acid and oxalic acid; and Yamamori et al., have obtained U.S. Pat. No. 4,482,701 for hydrolyzable polyester resins which contain therein a metallic salt of a hydroxy carboxylic acid.

In general, polyesters and copolyesters, as well as the preparation of these polymers, are described in both the scientific and patent literature. Carothers et al [*Journal of the American Chemical Society* 52:3292 (1930)], for example, describes the ester interchange reaction of various diols (such as ethylene glycol or 1.4-butanediol) and diesters to yield polymer. The preparation of polyesters of fiber-forming quality from dicarboxylic acids and diols is described in U.S. Pat. No. 2,952,652.

SUMMARY OF THE INVENTION

We have now discovered that copolyesters of aromatic and aliphatic types can be made to degrade over a period of time and with exposure to water, under hydrolytic conditions. Thus, commercially used aromatic polyesters, and products made therefrom, can be made to degrade after expiration of their useful lifetime by randomly incorporating a hydrodegradable segment into the polymer backbone by conventional copolymerization or transesterification of the reactant monomers. Depending upon the aliphatic comonomer and the amount used in the manufacture of the final polymer, the time for the loss of the physical properties of the polymer can be adjusted and thus degradation controlled. An additional advantage of the polymers according to the present invention is that the hydrolytic degradation cleanly forms oligomers with acid and alcohol end groups. The degraded material could then be recycled by the repolymerization of these new end groups.

Prior to our invention, there was little appreciation or recognition in the prior art of the hydrolysis of a copolymer containing mostly aromatic polyester units. In particular, there has been no suggestion of manufacturing environmentally degradable aromatic polyesters by the inclusion of aliphatic links susceptible to hydrolysis.

The copolymer formulations according to this present invention are degradable polyesters made from aromatic and aliphatic polyester moieties. Depending upon the amount and type of aliphatic unit used in the formulation of these copolymers, the resultant copolymers, and products made therefrom, will have varied (but limited) lifetimes upon exposure to water before they degrade. The environmentally degradable copolymers according to the present invention are of particular value for polymer articles and fibers that are routinely discarded after use. Exemplary of such articles are fishing lines, fishing nets, disposable containers, disposable diapers, and the like.

DETAILED DESCRIPTION OF THE INVENTION

In general, the copolymers of the present invention contain therein a moiety selected from the group consisting of:

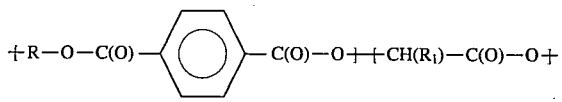

and

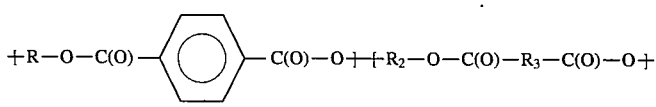

wherein

R is selected from the group consisting of a straight or branched alkylene moiety of 2 to 16 carbons (most preferably an alkylene moiety of 2 to 4 carbons) in length, a polyether of the formula $—[(CH_2)_n—O—]_x—(CH_2)_n—$, and mixtures thereof, wherein n is a number from 2 to 16, X is 1 to 1000 (most preferably 10 to 1000);

$R_1$ is hydrogen or a lower straight or branched alkyl moiety of 1 to 10 carbons in length;

$R_2$ is selected from the group consisting of a straight or branched alkylene moiety of 2 to 16 carbons (most preferably an alkylene moiety of 2 to 4 carbons) in length, a polyether of the formula $—[(CH_2)_n—O—]_x—(CH_2)_n—$, and mixtures thereof, wherein n is a number from 2 to 16, X is 1 to 1000 (most preferably 10 to 1000);

$R_3$ is a straight or branched alkyl moiety of 0 to 40 carbons, most preferably a straight moiety of 0 or 4 carbons or a branched moiety of 22 carbons; and with the proviso that said hydrodegradable random polyester copolymer does not contain therein a hydroxy metal salt of a carboxylic acid.

More specifically, the random copolymers of the present invention are comprised of a polyester polymer such as, for example, polyethylene teraphthalate; polybutylene teraphthalate; polyarlyates such as poly bisphenol-A teraphthalate; aliphatic polyester blocks in polyurethane block copolymers; polycarbonates; the polyester portion of polyether polyester segmented block copolymer thermoplastic elastomers; and ester or alcohol terminated telechelic polymers. The polyester polymer is randomly interrupted with a hydrodegradable segment such as polyhydroxy acids like polyglycolic acid, polylactic acid, polycaprolactone, polyhydroxy butyrate, and polyhydroxy valerate; polyaliphatic esters such as polybutylene oxalate and polyethylene adipate; polyalkyl anhydrides; polyalkyl carbonates such as polyethylene carbonate and polybutylene carbonates; and polyesters containing silyl ethers, acetals, or ketals.

The random copolymers of the present invention are conveniently prepared by either ester interchange reaction between the appropriate alkylene diol, diester and ester alcohol or appropriate dimer: or by transesterification reactions of the two homopolymers with the appropriate transesterification catalysts above the melting point of the two polymers.

In general, a copolymer according to the present invention may be prepared by the transesterification of two homopolymers. An example of such a transesterification is the modification of a known polyester, polybutylene terephthalate (PBT), with polyglycolic acid (PGA) according to the following reaction scheme.

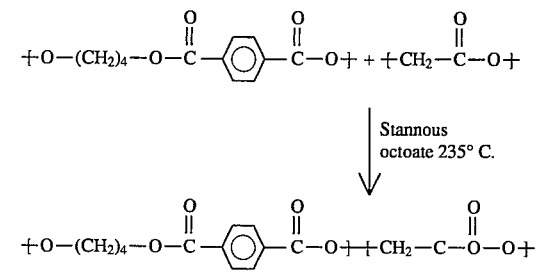

Other methods may be used to prepare copolymers according to the present invention. For example, copolymers may be prepared from the monomer according to the following reaction scheme.

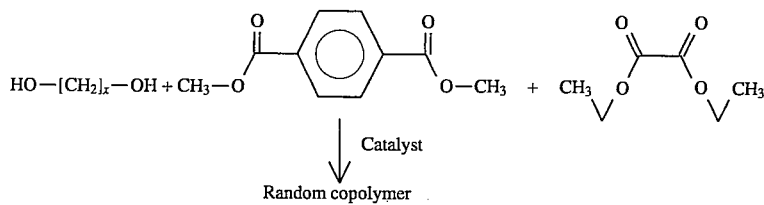

wherein R is hydrogen and X is 4.

In addition, a number of monomers may be substituted in this reaction. For example, polyethylene terephthalate or PET could be used in this reaction sequence by changing the polymer in transesterification or by changing the value of X to 2.

The hydrodegradable segments in the copolymers according to the present invention may be other than an oxalate moiety, as shown above. For example, the hydrolyzable moiety which becomes the hydrodegradable segment in the copolymer may be a lactide or larger alkyl moiety. Other possible alternatives for use as the hydrodegradable segments in the copolymer according to the present invention are adipate, p-dioxanone, 1,3-dioxan-2-one, caprolactone, siloxane, and anhydride moieties. These additional hydrolyzable linking segments can be used as homopolymers for transesterification (or as monomers) according to the following reaction scheme.

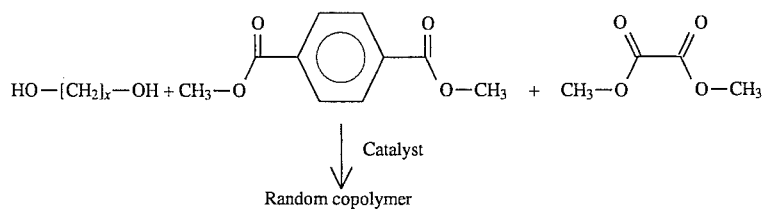

Random copolymer

A more thorough understanding of the process for making the random copolymers of the present invention may be obtained from the following examples which utilize polybutylene terephthalate, polyglycolic acid (PGA) and polytetramethylene oxalate (PO) as homopolymers. The transesterification reaction carried out under the conditions detailed in Example I yielded a copolymer containing PBT-:PGA in the rations of 90:10 and 95:5 (weight per cent).

EXAMPLE I

The reaction flask in which the copolymer was to be prepared was dried thoroughly and flushed with an inert gas. The following reaction mixture was then added to the flask and the flask heated to 235° C. under vacuum (2–4 mm. Hg) for 2 hours.

4.5 g polybutylene terephthalate 0.5 g polyglycolic acid 0.1–0.2 ml stannous octoate catalyst (0.33M solution in dry toluene: 0.3–0.5% by weight of PBT)

The reaction mixture attained a tan brown color and was allowed to cool to room temperature under an atmosphere of nitrogen. It was then crushed and purified by heating with ethyl acetate under reflux for 20 minutes. The intrinsic viscosity of the resulting copolymer was determined to be about 0.95 dl/g.

Preparation of the 95:5 copolymer was accomplished by taking PBT and PGA in the appropriate ratios and following the same procedure as described above for the 90:10 copolymer above. The intrinsic viscosity of this copolymer was found to be about 0.95 dl/g.

The preparation of polybutylene terephthalate-copolytetramethylene oxalate was carried out in accordance with Example II. The resulting PBT-PTMO copolymer was prepared in the ratios of 90:10 and 70: 30 (weight percent).

EXAMPLE II

The reaction flask in which the copolymer was to be prepared was dried thoroughly and flushed with an inert gas. The following reaction mixture was then added to the flask and the flask heated to 235°–240° C. under vacuum (2–4 mm Hg) for 2 hours.

45 g polybutylene terephthalate 5 g polytetramethylene oxalate 0.1–0.2 ml stannous octoate catalyst (0.33M solution in dry toluene)

The mixture attained a tan brown color and was allowed to cool to room temperature under an atmosphere of nitrogen. It was then crushed to a fine powder and the intrinsic viscosity of the copolymer was determined to be about 1.08 dl/g.

Preparation of the 70:30 copolymer was carried out by taking the PBT and PTMO in the appropriate ratios and following the procedure as described for the 90:10 copolymer above. The intrinsic viscosity of this copolymer was found to be about 1.1 dl/g.

The copolymers produced by Examples I and II were characterized by NMR using a Bruker 200 MHz instrument (80:20 V:V mixture of deuterated chloroform and deuterated trifluoroacetic acid as the solvent). Thermal analysis of the samples was carried out in a Perkin-Elmer 7 series Differential Scanning Calorimeter. Hydrolysis of the copolymers was followed by viscometry using a Cannon-Ubblehode viscometer and a $3/5$ (V/V) phenol and tetrachloroethane solvent maintained at 3° C., 33° C., and 50° C.

NMR studies of the PBT-PGA polymer indicated that the polymer obtained is a true copolymer and not a blend. The methylene absorption of the copolymer was seen at five individual peaks between 4.8 and 5.38 as would be expected from the random to blocky placement of the glycolide repeat units along the PBT backbone.

Thermal analysis of the copolymer of PBT-PGA showed a slight depression in the melting temperature for the higher molecular weight products. The low molecular weight copolymers showed a greater depression in the melting temperature. The heat of fusion (a measure of the % crystallinity) of the copolymer increased and then decreased over a period of 50 to 55 days for the samples maintained at 60° C.

The viscometric studies in Tables 1, 2 and 3 indicate a significant decrease in the intrinsic viscosity (indicative of a change in molecular weight of the copolymer and also of a change in the physical properties for the polymer) of copolymers made in accordance with the present invention when hydrolyzed in water.

TABLE 1

| | (PBT-PGA 95:5) Intrinsic Viscosity | | |
|---|---|---|---|
| Days | 3° C. | 33° C. | 50° C. |
| 3 | | 0.44 | 0.48 |
| 4 | 0.41 | | |
| 12 | | 0.42 | 0.40 |
| 15 | 0.40 | | |
| 16 | | 0.41 | 0.39 |
| 20 | 0.40 | | 0.35 |
| 24 | | | 0.34 |
| 40 | | | 0.34 |
| 50 | 0.36 | 0.36 | |
| 55 | 0.39 | | |
| 62 | | 0.35 | |
| 77 | | 0.29 | |

TABLE 2

(PBT-PGA 90:10) Intrinsic Viscosity

| Days | 3° C. | 33° C. | 50° C. |
|------|-------|--------|--------|
| 0    |       |        | 0.55   |
| 4    | 0.39  |        | 0.38   |
| 6    |       | 0.41   |        |
| 12   | 0.35  |        | 0.36   |
| 16   |       | 0.40   | 0.33   |
| 20   | 0.35  |        | 0.30   |
| 40   |       |        | 0.27   |
| 50   |       | 0.27   |        |
| 55   | 0.38  |        |        |
| 62   | 0.39  | 0.28   |        |
| 72   | 0.38  |        |        |
| 77   |       | 0.29   |        |

TABLE 3

(PBT-PO) Intrinsic Viscosity

| Days | 99:1 | 90:10 | 70:30 |
|------|------|-------|-------|
| 0    | 0.99 | 1.09  | 1.21  |
| 5    | 0.98 | 0.41  | 0.11  |
| 10   | 0.86 |       | 0.09  |

The intrinsic viscosities of the samples, as tabulated in Tables 1 and 2 for PBT-PGA copolymer and in Table 3 for PBT-PO copolymer, decreased at different rates depending upon the temperature at which they were maintained. The decrease in intrinsic viscosity implies that the copolymeric material degrades to lower molecular weight with water.

These data indicate that the viscosity falls at a faster rate at higher temperature and that the rate of degradation is increased as the weight percent of the PGA is increased.

Fiber formation utilizing both polyglycolic and polyoxalate as the random hydrolyzable segments in the polyester co-polymer backbone have been successfully carried out using a single screw laboratory scale extruder.

Although the polymeric ratio is a matter of choice depending upon the physical characteristics of the final copolymer desired, the copolymers of the present invention may also be manufactured as a concentrate having the aromatic polyester moiety as a minor proportion (by weight percent), and the hydrodegradable segments as the major proportion. For example, the concentrate can easily be prepared and stored as a 5:95 polyester: hydrolyzable moiety copolymer. Prior to the manufacture of a product utilizing the random copolymers of the present invention, the concentrate would have the bulk of the polyester material added to it to arrive at the desired polymeric concentration. For example, by adding additional bulk PBT polyester to a 5:95 PBT:PGA concentrate, the final copolymer prepared from this material can be adjusted to have the 95:5 ratio of the copolymer in Table 1. Of course, present polymeric compositions are considered to be concentrates in accordance to the present invention, and the addition of a hydrolyzable moiety to these concentrates to achieve hydrodegradable segments.

Thus, while we have illustrated and described the preferred embodiments of our invention, it is to be understood that this invention is capable of variation and modification, and we therefore do not wish to be limited to the precise terms set forth, but desire to avail ourselves of such changes and alterations which may be made for adapting the invention to various usages and conditions. Accordingly, such changes and alterations are properly intended to be within the purview of the following claims.

Having thus described our invention and the manner and process of making and using it in such full, clear, concise and exact terms so as to enable any person skilled in the art to which it pertains, or with which it is most nearly connected, to make and use the same.

Each of the publications and patents, referred to hereinabove, are expressly incorporated herein by reference in their entirety.

What is claimed is:

1. A hydrodegradable polyester copolymer consisting essentially of a substantially non-degradable aromatic polyester subunit and a hydrodegradable oxalate subunit and having the formula

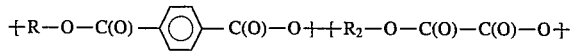

wherein R is selected from the group consisting of a straight or branched alkylene of 2 to 16 carbons in length, a polyether of the formula $-[(CH_2)_n-O]_x-(CH_2)_n-$, or a mixture thereof, wherein n is a number from 2 to 16 and X is a number from 1 to 1000;

$R_2$ is selected from the group consisting of a straight or branched alkylene of 2 to 16 carbons in length, a polyether of the formula $-[(CH_2)_n-O]_x-(CH_2)_n-$, or a mixture thereof, wherein n is a number from 2 to 16 and X is a number from 1 to 1000, said hydrolyzable oxalate subunit being randomly distributed in, and comprising 5–30 weight percent of said copolymer, the balance of said copolymer being said aromatic polyester subunit, and said copolymer exhibiting a significant decrease in intrinsic viscosity when hydrolyzed in water at a temperature of about 50° C. for about 3–4 days.

2. As an article of manufacture, the copolyester of claim 1 in the form of fishing line.

\* \* \* \* \*